United States Patent
Shtarkman

[11] Patent Number: 6,068,249
[45] Date of Patent: May 30, 2000

[54] CONTROLLABLE VEHICLE STRUT

[75] Inventor: Emil M. Shtarkman, Marina Del Rey, Calif.

[73] Assignee: TRW Inc., Lyndhurst, Ohio

[21] Appl. No.: 09/064,863

[22] Filed: Apr. 22, 1998

[51] Int. Cl.$^7$ ............................................. F16F 9/53
[52] U.S. Cl. .......................... 267/140.14; 267/140.15; 188/267.1
[58] Field of Search ..................... 188/267, 267.1, 188/267.2; 248/550; 267/140.14, 140.15

[56] References Cited

U.S. PATENT DOCUMENTS

| | | |
|---|---|---|
| 2,973,969 | 3/1961 | Thall . |
| 3,185,260 | 5/1965 | Navarro . |
| 4,819,772 | 4/1989 | Rubel . |
| 4,858,733 | 8/1989 | Noguchi et al. . |
| 4,942,947 | 7/1990 | Shtarkman . |
| 4,992,190 | 2/1991 | Shtarkman . |
| 5,176,368 | 1/1993 | Shtarkman . |
| 5,259,487 | 11/1993 | Petek ......................... 188/267.1 |
| 5,354,488 | 10/1994 | Shtarkman et al. . |
| 5,454,451 | 10/1995 | Kawamata et al. ............. 188/267.1 |
| 5,492,312 | 2/1996 | Carlson . |
| 5,522,481 | 6/1996 | Watanabe . |
| 5,947,238 | 9/1999 | Jolly et al. .................... 188/267.1 |

FOREIGN PATENT DOCUMENTS

| | | | |
|---|---|---|---|
| 000401009 | 12/1990 | European Pat. Off. ........ | 188/267.1 |
| 401199031 | 8/1989 | Japan ............................ | 188/267.1 |
| 405162524 | 6/1993 | Japan ............................ | 188/267.2 |

*Primary Examiner*—Chris Schwartz
*Attorney, Agent, or Firm*—Tarolli, Sundheim, Covell, Tummino & Szabo L.L.P.

[57] ABSTRACT

A controllable strut (10) includes a helical spring (22) which extends between first and second end portions (12 and 14) of the strut (10). A field responsive fluid (30) is disposed about the spring. A source of electromagnetic energy (40) provides a magnetic field through at least a portion of the fluid (30) and the spring (22). The fluid viscosity changes with changes in the intensity of the magnetic field.

20 Claims, 3 Drawing Sheets

CONTROLLABLE VEHICLE STRUT

BACKGROUND OF THE INVENTION

The present invention relates to an apparatus for damping movement between two parts of a vehicle, and more particularly relates to a controllable strut apparatus for damping movement between two spaced apart vehicle parts.

Numerous types of shock absorbers and struts have been developed for damping movement between two parts of a vehicle, such as between a wheel and a vehicle frame. Some devices include springs, fluids, or a gaseous material to provide damping, while others utilize various combinations of such structures and materials. More complicated damping structures also have been developed to provide for varying amounts of damping through the use of numerous complex fluid chambers and orifices that control fluid movement under load conditions. Other devices incorporate a plurality of spring elements, such that different spring elements may become operable under varying load conditions. It is desirable to selectively damp movement between two vehicle parts, without requiring such complicated structures.

SUMMARY OF THE INVENTION

The present invention is directed to a controllable strut apparatus for a vehicle. The strut apparatus includes first and second end portions and a helical spring. The spring has an axis extending longitudinally between the first and second end portions of the strut, with the spring being resistant to axial compression. A field responsive fluid is disposed about the spring. A source of electromagnetic energy provides a magnetic field through at least portion of the fluid and the spring. The field responsive fluid has a viscosity according to the intensity of the magnetic field through the fluid.

BRIEF DESCRIPTION OF THE DRAWINGS

A preferred embodiment of the present invention is described with reference to the accompanying drawings, in which.

DETAILED DESCRIPTION OF A PREFERRED EMBODIMENT

Figure 1:
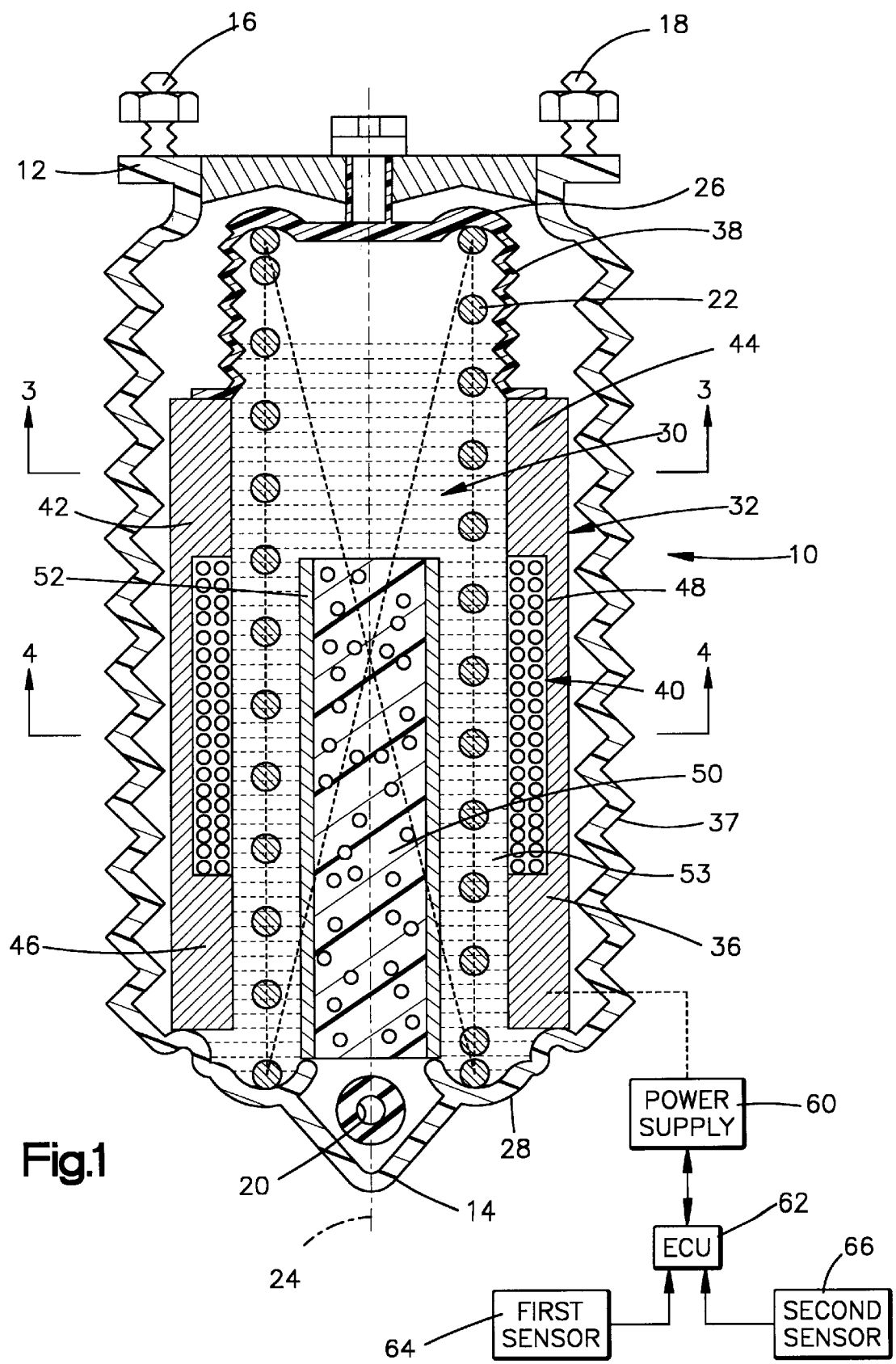
FIG. 1 is a sectional view of a strut apparatus in accordance with the present invention.

A preferred embodiment of a controllable strut apparatus, generally indicated at 10, is illustrated in FIGS. 1–4. The strut 10 has first and second end portions 12 and 14, respectfully, which may be connected to spaced apart vehicle parts. Preferably, appropriate threaded fasteners 16 and 18 mount the strut first end 12 to a lower portion of a vehicle body (not shown). Similarly, the strut second end 14 is attached adjacent the central axis of a vehicle wheel (not shown). More specifically, the second end portion 14 includes a bushing 20, suitably formed of an elastomer, such as rubber. The bushing 20 may be mounted to a wheel spindle member, such as for a front wheel drive vehicle, or to a lower control arm of the vehicle. The strut 10 of the present invention may be mounted in any known manner between other vehicle parts. As with conventional struts and shock absorbers, the strut 10 operates to dampen the relative movement between the vehicle parts, suitably a vehicle body and wheel, to which the end portions 12 and 14, respectively, are attached.

Figure 2:
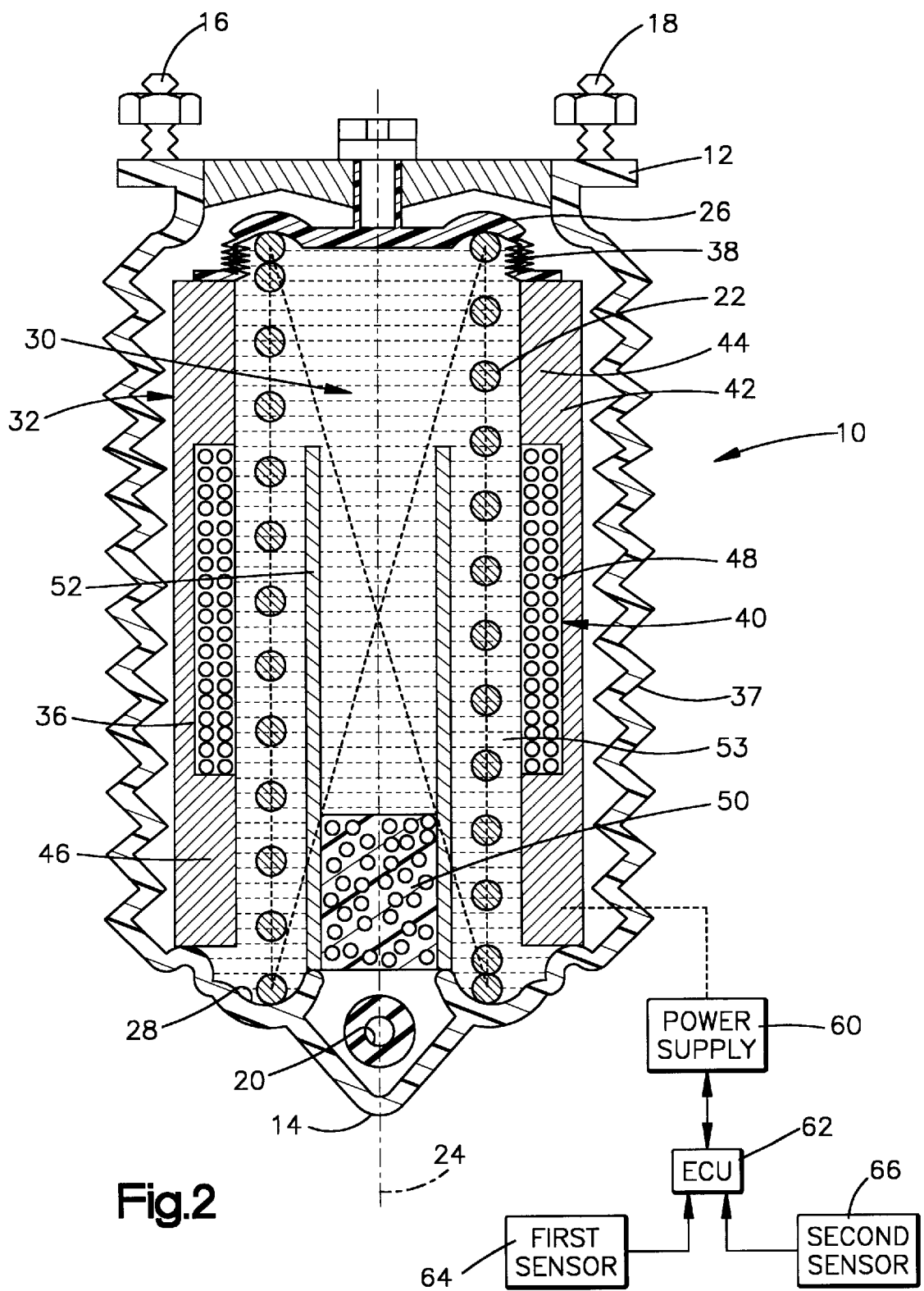
FIG. 2 is a view of the strut of FIG. 1 in a compressed condition.
Figure 4:
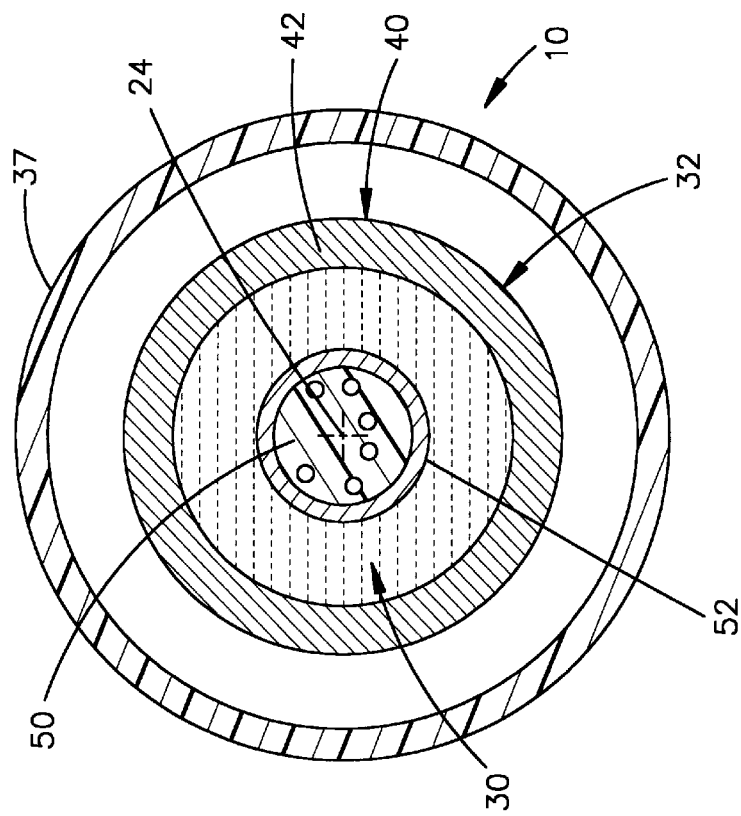
FIG. 4 is a sectional view of FIG. 1 taken along line 4—4 of FIG. 1.
Figure 3:
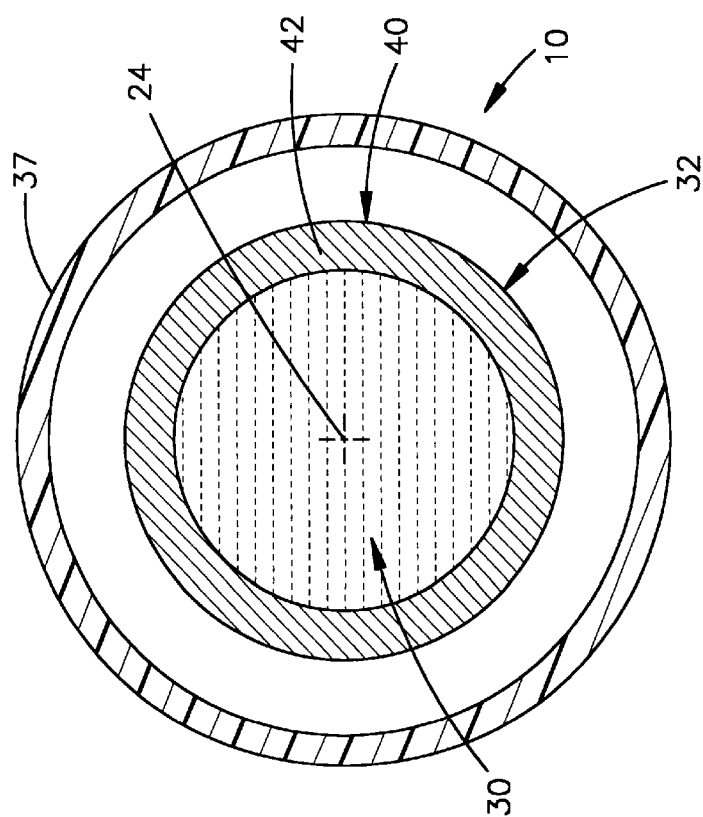
FIG. 3 is a sectional view of FIG. 1 taken along line 3—3 of FIG. 1.

The strut 10 also includes a helical spring element 22 having an axis 24 extending longitudinally between the first and second end portions 12 and 14. The spring 22 has a predetermined spring constant and is resistant to axial compression and expansion of the strut 10. The spring 22 is preferably formed of a magnetically conducting material, such as a suitable metal. As shown in FIGS. 1 and 2, the spring 22 is disposed between an upper spring bed 26 positioned adjacent the strut first end 12 and a lower spring bed 28 positioned adjacent the strut second end 14.

The strut 10 also includes a field responsive fluid 30 disposed in a fluid chamber about the spring 22. Preferably, the fluid 30, which may be a magnetic fluid, a rheological fluid or a magnetorheological fluid, is formed of ferromagnetic particles disposed within a fluid. Specifically, for example, the fluid 30 may comprise solid magnetizable carbonyl iron particles suspended in an oil and a suitable dispersant, such as a silica gel. Suitable field responsive fluids are disclosed in U.S. Pat. No. 4,992,190, entitled "Fluid Responsive To A Magnetic Field" and in U.S. Pat. No. 5,354,488, entitled "Fluid Responsive To A Magnetic Field," both of which are assigned to TRW Inc. Of course, other field responsive fluids may be used.

The fluid 30 is held in position about the spring 22 by a housing 32 having a generally cylindrical sidewall portion 36 extending between the first and second end portions 12 and 14. The lower spring bed 28 defines the lower portion of the housing 32, with the upper portion being defined by the upper spring bed 26. As shown in the preferred embodiment of FIGS. 1–4, the sidewall portion 36 of the housing 32 is substantially coaxial with the spring axis 24 and includes a lower rigid core 42 and an upper flexible portion 38. The flexible portion 38 permits axial expansion and compression of the housing 32. Thus, the upper and lower spring beds 26 and 28, the lower rigid core 42 and upper flexible portion 38 of the housing 32 enclose the spring 22 and the fluid 30. The strut 10 also preferably includes an outer flexible protective enclosure 37 surrounding the housing 32 and extending between the strut end portions 12 and 14.

The strut apparatus 10 also includes an electromagnetic circuit, which includes the spring 22 and a source of electromagnetic energy 40. The circuit provides a magnetic field through at least a portion of the fluid 30. The viscosity of the fluid 30 changes in response to changes in the magnetic field through the fluid 30.

The source of electromagnetic energy 40 is provided by the elongated core 42 which has spaced apart and opposed pole end portions 44 and 46. Preferably, the pole end portions 44 and 46 are symmetrical and equal in length. A plurality of coil windings 48 are disposed within a central section of the core 42 between the poles 44 and 46, such that the axial length of the coil windings 48 is about 30%–50% of the total axial length of the core 42. In the preferred embodiment shown in FIGS. 1–4, the core 42 is an elongated cylindrical electromagnetic assembly that is coaxial with and circumscribes a substantial portion of the spring 22.

When the source of electromagnetic energy 40 is energized appropriately, a magnetic flux path (not shown) travels from the pole 44 through the coils of the spring 22 and the fluid 30 and returns to the opposing pole 46 of the core 42. The viscosity of the fluid 30 increases as the magnetic field through the fluid 30 increases. It will be understood that the particular direction of the flux path is not critical to operation of the present invention and will be determined by the current flow through the coil windings 48. While the source of the electromagnetic energy 40 is shown and described as the core 42 and coil windings 48, it will be understood and appreciated that the source may conveniently include a permanent magnet, a combination of a permanent magnet and a coil assembly or any other means for providing a desired magnetic field.

The preferred embodiment of the present invention includes an elongated compressible biasing element 50 positioned within the spring 22. The compressible biasing element 50 is oriented generally parallel to, and preferably coaxial with the spring axis 24.

The preferred biasing element 50 is a resilient closed cell foam material positioned within a guide element 52, which maintains the closed cell foam material substantially coaxial with the spring axis 24. The guide element 52 is a rigid cylindrical member generally coaxial with the spring axis 24. The closed cell foam material has a predetermined volume in a non-load condition, preferably equal to the volume defined by the interior of the guide element 52, as is shown in FIG. 1. Upon axial compression of the strut 10, the fluid 30, which communicates with the closed cell foam biasing element 50, axially compresses the biasing element 50 to a decreased volume within the guide element 52. This is shown, for example, in FIG. 2. The volume between the source of the core 42 of the housing 32 and the guide element 52 defines an annular fluid chamber portion 53.

Preferably, the guide element 52 is formed of an magnetically conducting material, such as a metal, namely steel or an alloy thereof. The cylindrical guide element 52 is positioned within the spring 22 and is preferably coextensive with the pole 46 and the coil 48. The magnetically conducting guide element 52 increases the magnetic field through the fluid 30 by providing an additional flux path. The magnetic flux path (not shown) of the electromagnetic circuit travels from the pole 44 through the magnetically conducting spring 22 and the fluid 30 as well as axially through the inner metal guide element 52 and returns to the lower pole 46 of the core 42.

As schematically illustrated in FIGS. 1 and 2, the source of electromagnetic energy 40 is energized by a power supply 60 under the control of an electronic control unit (ECU) 62. Preferably, the ECU 62 is a microcomputer but may also comprise a plurality of discrete circuits, circuit components and/or an application specific integrated circuit (ASIC) configured to accomplish the desired functions. The ECU 62 receives signals from a first sensor 64 and a second sensor 66 from which it determines the relative position of the first and second end portions 12 and 14 of the strut 10.

Preferably, the first and second sensors 64 and 66 are acceleration sensors, suitably accelerometers. The first sensor 64 detects vertical acceleration of the vehicle body, and may be connected to or at least moveable with the strut first end 12. The second sensor 66 suitably detects vertical acceleration of the wheel axle, and may be connected to or at least moveable with the strut second end 14. Accordingly, the first sensor 64 provides a signal indicative of the acceleration of the strut first end 12 and the second sensor 66 provides a signal indicative of the acceleration of the strut second end 14.

The acceleration signals are provided to the ECU 62 where they are appropriately processed to determine the relative position of the strut first and second end portions 12 and 14. The respective acceleration signals may be integrated a first time to determine the velocity of the vehicle body and vehicle wheel, and may be integrated a second time to determine the positions of the first and second end portions 12 and 14. The use of accelerometers to determine velocity and position is well known. For example, the ECU 32 may accomplish the integration by performing a plurality of summations of discrete values of the acceleration signal, which are sampled over time. A more detailed description of an acceptable process for determining velocity and/or position using an acceleration sensor may be found in U.S. Pat. No. 5,498,028 to Carlin et al., which is assigned to TRW Inc. It will be understood that other means for determining the velocity and position of the strut first and second end portions 12 and 14 may also be used.

Based upon the velocity, acceleration and/or relative positions of the respective strut first and second end portions 12 and 14, the coil windings 48 may be energized to provide a desired amount of damping by the strut 10. It has been determined that for an active strut maximum damping should be applied during a rebound motion, which occurs during expansion of the strut 10, such as shown in FIG. 1.

Because the fluid viscosity increases as the intensity of the field acting on the fluid 30 increases, the fluid 30 has a tendency to remain within the magnetic flux path and not easily flow. Accordingly, relative movement of the strut first and second ends 12 and 14 will be inhibited during application of the magnetic field through the fluid 30. The field may be increased or decreased based on signals from the sensors 64 and 66 to provide desired damping. The amount of magnetic field to apply in response to the sensor signals may be based upon empirical testing of a particular vehicle platform and the load-deflection characteristics of the strut 10. Such information may be stored in the ECU 62, such as in look-up tables, to control the field strength in response to the sensor signals.

FIG. 2 illustrates the strut 10 in a compressed, or jounce position in which the relative position of the strut first and second ends 12 and 14 is minimized. As the strut 10 stretches towards the rebound position, as shown in FIG. 1, the ECU 62 controls the power supply 60 to increase the magnetic field, thereby damping movement between the strut first and second ends 12 and 14. The strut 10 will seek to return to its rest position generally intermediate the jounce and rebound positions when the source of electromagnetic energy 40 is deenergized.

The total axial forces provided by the strut 10, when energized, will be those contributed by the spring 22, the field responsive fluid 30 in its energized state plus the forces contributed by the closed cell foam biasing element 52. Accordingly, the load-deflection characteristics of the strut 10 are thus controllable by the amount of current introduced into the coil windings 48.

While the preferred embodiment describes an actively controlled strut 10, it will be understood that the present invention is equally applicable to a passive strut, with a permanent magnet assembly replacing the electromagnetic assembly 40. Accordingly, a substantially constant magnetic field through the fluid 30 will maintain an increased viscosity of the fluid, thereby providing a desired damping characteristic according to the applied field.

From the above description of a preferred embodiment of the present invention, those skilled in the art will perceive improvements, changes and modifications. Such improvements, changes and modifications within the skill of the art are intended to be covered by the appended claims.

What is claimed:

1. A controllable strut for a vehicle comprising:

first and second end portions;

a helical spring having a longitudinal axis extending longitudinally between said first and second end portions, said spring being resistant to axial compression and expansion;

a magnetic field responsive fluid disposed about said spring; and a source of electromagnetic energy for providing a magnetic field through at least a portion of said fluid and said spring to control the viscosity of said fluid, said fluid having a viscosity that changes according to the intensity of said magnetic field through said fluid, said source of said electromagnetic energy having an elongated core with opposed pole end portions and a plurality of coil windings between said opposed pole end portions, with said elongated core having a longitudinal axis generally parallel to said spring axis.

2. The strut of claim 1 further comprising an elongated compressible biasing element having a longitudinal axis generally parallel to said spring axis, said compressible biasing element positioned within said spring and being resistant to axial compression and expansion of said strut.

3. The strut of claim 2 further comprising a generally cylindrical guide element for maintaining said compressible biasing element substantially coaxial with said spring.

4. The strut of claim 3 wherein said guide element encloses said compressible biasing element for maintaining said compressible biasing element substantially coaxial with said spring axis.

5. The strut of claim 4 wherein said compressible biasing element comprises a resilient closed cell foam material.

6. The strut of claim 3 wherein said guide element is formed of a rigid magnetically conducting material through which said magnetic field travels.

7. The strut of claim 2 wherein said compressible biasing element comprises a closed cell foam material.

8. The strut of claim 7 wherein, upon axial compression of said strut, said fluid communicates with said closed cell foam material to compress said closed cell foam material to a decreased volume.

9. The strut of claim 2 wherein, upon axial compression of said strut, said fluid communicates with said compressible biasing element and axially compresses said compressible biasing element.

10. The strut of claim 1 further comprising a housing enclosing said spring and said fluid, said housing having a generally cylindrical side wall portion extending between said first and second end portions.

11. The strut of claim 10 wherein said housing side wall portion further comprises said source of electromagnetic energy.

12. The strut of claim 1 wherein said elongated core comprises an elongated cylindrical electromagnetic assembly substantially coaxial with and circumscribing a substantial portion of said spring.

13. The strut of claim 1 wherein said fluid viscosity increases as said magnetic field intensity increases.

14. The strut of claim 1 further comprising a sensor for sensing acceleration of at least one of said end portions, said source of electromagnetic energy being responsive to said sensor.

15. A controllable strut assembly comprising:

a cylindrical assembly having a longitudinal axis and for providing a magnetic field;

a cylindrical member spaced radially inward from and coaxial with said electromagnetic assembly, with the space between said electromagnetic assembly and said cylindrical member defining an annular chamber;

a spring element interposed between said electromagnetic assembly and said cylindrical member, said spring element extending through said annular chamber;

a field responsive fluid disposed within said annular chamber about said spring element, said fluid having a viscosity that changes according to the intensity of a magnetic field produced by said assembly; and said assembly providing a magnetic field that extends through said fluid and through said spring element and said inner cylindrical member, said electromagnetic assembly having an elongated cylindrical core with first and second end portions and a plurality of windings positioned around said core intermediate said first and second core end portions.

16. The strut of claim 15 further comprising a compressible biasing element disposed within said inner cylindrical member.

17. The strut of claim 16 wherein said compressible biasing element comprises a resilient closed cell foam material.

18. An apparatus for damping movement between two parts of a vehicle, said apparatus comprising:

first and second end portions;

a helical spring having a longitudinal axis extending longitudinally between said first and second end portions, said spring being resistant to axial compression and expansion;

a field responsive fluid disposed about said spring;

a source of energy for providing a field through at least a portion of said field responsive fluid and said spring, said field responsive fluid having a viscosity according to the intensity of said field through said field responsive fluid; and a compressible biasing element positioned within said spring and being resistant to axial compression and expansion of said apparatus.

19. The apparatus of claim 18 further comprising a generally cylindrical guide element for maintaining said compressible biasing element substantially coaxial with said spring.

20. The apparatus of claim 19 wherein said guide element is formed of a rigid magnetically conducting material through which said field travels.

* * * * *